United States Patent [19]

Huelsman

[11] 4,183,087
[45] Jan. 8, 1980

[54] PEAK DEVIATION SAMPLING

[75] Inventor: Kenneth A. Huelsman, Carlsbad, Calif.

[73] Assignee: Hughes Aircraft Company, Culver City, Calif.

[21] Appl. No.: 884,329

[22] Filed: Mar. 7, 1978

[51] Int. Cl.² .................... G06F 15/20; H03K 5/20
[52] U.S. Cl. .................... 364/515; 328/135; 328/151; 358/138; 364/487
[58] Field of Search ............. 364/487, 515; 358/135, 358/136, 138; 179/15 BW, 15.55 R; 340/347 SH; 324/103 R, 103 P; 328/135, 150, 151

[56] References Cited

U.S. PATENT DOCUMENTS

| | | | |
|---|---|---|---|
| 3,600,565 | 8/1971 | Forbes | 328/135 X |
| 4,028,506 | 6/1977 | Araseki et al. | 328/151 X |
| 4,031,505 | 6/1977 | Owens | 328/135 X |
| 4,039,784 | 8/1977 | Quarton et al. | 324/103 R |
| 4,053,840 | 10/1977 | Baron | 328/151 |

Primary Examiner—Jerry Smith
Attorney, Agent, or Firm—Walter J. Adam; W. H. MacAllister

[57] ABSTRACT

A method and apparatus is disclosed for periodic sampling of a signal by taking a number of successive samples of the signal during each sampling interval, determining the maximal and minimal sample during each interval, determining the extent of deviation of each maximal and minimal from the sample selected for the last interval, and selecting as the sample best representative of the present interval the maximal or minimal, depending on which has the greatest deviation. If they have equal deviation, one may be consistently selected, preferably the minimal, but instead the last updated value, minimal or maximal, is used.

7 Claims, 4 Drawing Figures

PEAK DEVIATION SAMPLING

BACKGROUND OF THE INVENTION

This invention relates to a method and apparatus for compression of waveform sampled data, and particularly to such a system for a digital data processor for a sampled video signal.

The customary method of sampling a waveform, such as a video signal for digital processing, does not take into consideration all of the data contained in a sample period for maximum fidelity of the sample data. Usually periodic point sampling is performed, often with an averaging effect due to the speed of the sampling circuit. This point sampling technique is commonly used for digital control of video display because the display is customarily comprised of a matrix of picture elements (pixels) arranged in rows and columns. For each pixel, all that can be encoded in digital form is one sample value. This is not adequate to yield maximum fidelity even if the sampling rate is at the Nyquist limit of 2 f where the essential frequency range of the video signal is limited to f cycles per second, i.e., even if the sampling (pixel) interval is the Nyquist interval of $\frac{1}{2}$ f. In a practical application, the sampling rate is usually much less than the Nyquist limit of 2 f because of the limited number of pixels in the array, typically 265×265 or 512×512 pixels. It would be desirable to encode for pixel display a value which has more information about the signal during the pixel interval than just its amplitude at the sampling point in order to enhance the video display.

SUMMARY OF THE INVENTION

In accordance with the present invention, a number of successive samples are taken of an input signal during a periodic interval, and one of those samples which has the greatest deviation from the selected sample of the previous interval is selected for the present interval as the maximal, or minimal, value of the interval. At the beginning of each interval sequence, the first sample is stored as the maximal and minimal references for comparison with succeeding samples. If at any time a sample of greater value then the maximal reference is received, it replaces the maximal reference, but not the minimal reference, and if at any time a sample of smaller value then the minimal reference is received, it replaces the minimal reference, but not the maximal reference. In that manner the maximal (MAX) and minimal (MIN) samples occurring during the interval are selected as candidates for the value that best represents the input waveform for that interval. Which of the candidates is selected and stored as the LAST sample of the signal waveform is determined by determining which of the maximal or minimal has the greatest deviation from the sample selected for the last interval. If they have equal deviation, one or the other is consistently selected, preferably the minimal. That may be implemented by first subtracting the previous last sample from the maximal to determine the extent of positive deviation, P$\Delta$, from the last sample in accordance with the equation:

MAX−LAST=P$\Delta$, and subtracting the minimal from the previous last sample to determine the extent of negative deviation, N$\Delta$, from the last sample in accordance with the equation:

LAST−MIN=N$\Delta$, and then selecting the maximal or the minimal according to which represents the greatest deviation in accordance with the criteria:

P$\Delta$>N$\Delta$; select MAX

N$\Delta$>P$\Delta$; select MIN

P$\Delta$=N$\Delta$; select MIN or MAX, whichever was updated last.

While the choice in the last case may be MIN or MAX, according to which was updated last, it could always be the same choice, such as MIN.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
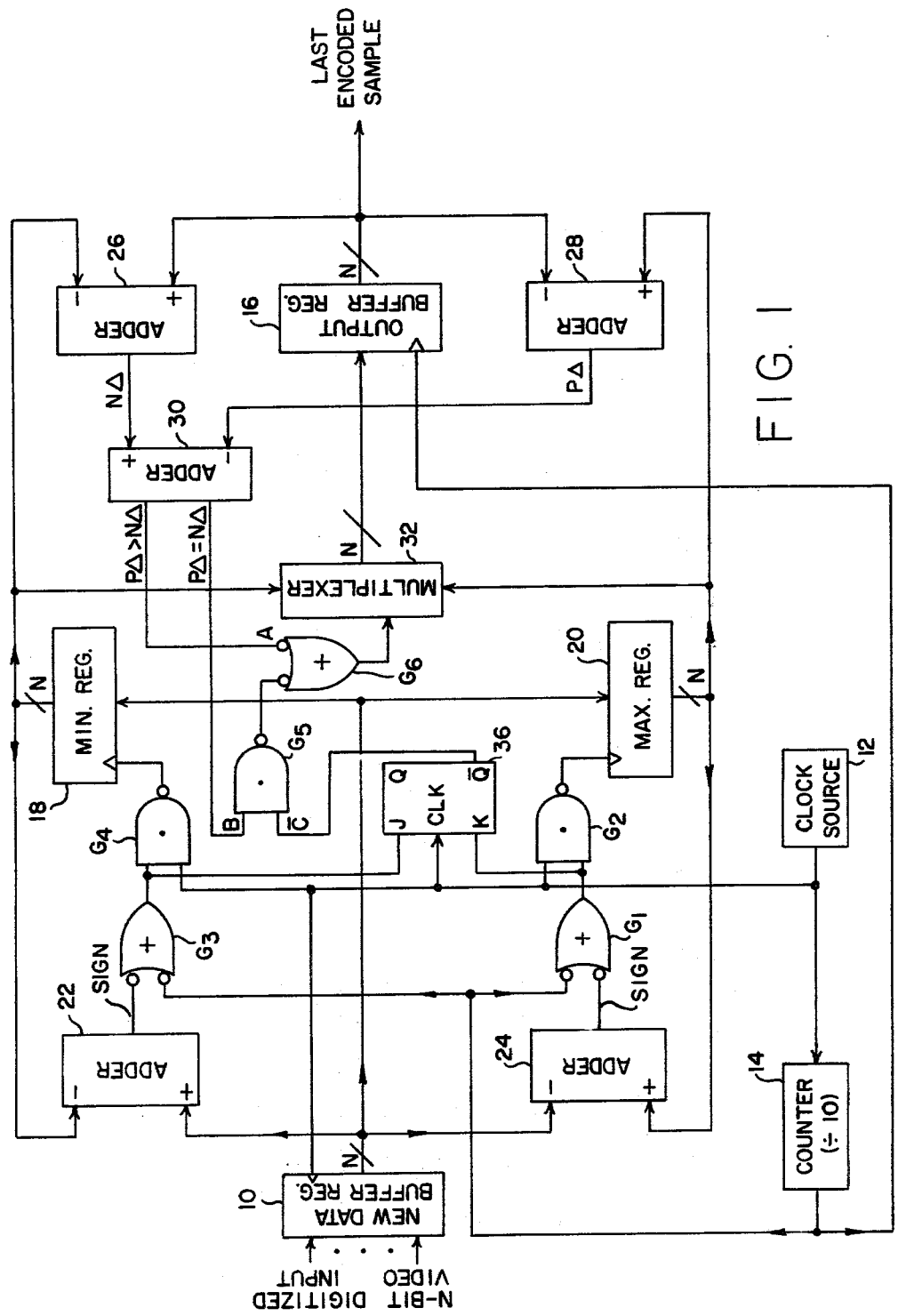
FIG. 1 shows a preferred embodiment of the invention.

The organization and operation of a preferred embodiment will first be described with reference to FIG. 1, following which advantages of the invention will be discussed. As noted hereinbefore, the invention relates to a system for compressing waveform sampled data such as from a sampled video signal.

The video signal is sampled and converted to digital form by conventional means (not shown) and entered into a new data buffer register 10 under control of a sample clock from a source 12 operating at a frequency of 10 MHz. A counter 14 divides the clock by some convenient number, such as 10, to produce a sample interval boundary clock applied to an output buffer register 16 to select one out of every ten samples entered into the input buffer register 10. However, the one sample selected is not every tenth input sample, but rather that one sample in the boundary interval which is the maximal or minimal sample occurring during the interval, depending upon which of the two has the greatest deviation from the sample selected during the last interval.

The maximal and minimal samples are selected by storing the first sample of the current interval in both a minimal register 18 and a maximal register 20 under control of a sample interval boundary clock pulse applied via gates $G_1$, $G_2$ and $G_3$, $G_4$. Thereafter, the contents of the registers 18 and 20 are compared with subsequent samples in adders 22 and 24. Adder 22 adds the new sample (NEW) to the 2's complement of the old sample (MIN) in the minimal register to form the sum NEW−MIN. The sign of the sum will be negative (1) when NEW<MIN, in which case the sign (carry) at the output of the adder enables the minimal register to be updated. That is accomplished by enabling gate $G_4$ via gate $G_3$. Similarly, adder 24 adds the 2's complement of the old sample (MAX) in the maximal register 20 to the new sample (NEW) to form the sum MAX—NEW. The sign of the sum will be negative (1) when the MAX<NEW, in which case the sign (carry) at the output of the adder enables the maximal register to be updated via gates $G_1$ and $G_2$. In that manner the maximal (MAX) and minimal (MIN) samples occurring during a sample interval defined by the boundary clock from the counter 14 are latched in the registers 20 and 18, respectively, by the end of the interval. Next, the last sample (LAST) latched in the output buffer register 16 is compared with the MIN and MAX of the interval using adders 26 and 28 to form the sums $N\Delta = $ LAST—MIN and $P\Delta = $ MAX—LAST. These sums represent the respective minimal deviation, $N\Delta$, and maximal deviation, $P\Delta$, of the interval. These deviations are then compared in an adder 30 which adds $N\Delta$ to the 2's complement of $P\Delta$ to form the sum $N\Delta - P\Delta$, the sign of which will be negative (1) when $P\Delta > N\Delta$, indicating that MAX represents a greater deviation than MIN from the last sample LAST, in which case MAX is entered into the output buffer register via a multiplexer 32. At all other times, the sign is positive (0), indicating that MIN represents a greater deviation than MAX, in which case MIN is entered into the output buffer register unless the sum is zero, the case where $P\Delta = N\Delta$. For that condition, either MIN or MAX is chosen to be entered into the output buffer register 16 according to which was updated last under control of logic gates $G_5$ and $G_6$, which receive two inputs A and B from the adder 30 and a third input from a J-K flip flop 36 which is set or reset with each sample clock according to whether a new sample establishes a new minimal or maximal. When the inputs are defined as follows:

A: $P\Delta > N\Delta$,
B: $P\Delta = N\Delta$,
C: last sample was stored in MIN REG., and
$\overline{C}$: last sample was stored in MAX REG., the logic gates select MAX from the register 20 via the multiplexer 32 according to the following logic equation MAX = A + B$\overline{C}$. When A is not true because $N\Delta > P\Delta$, MIN is selected, unless B is true because $P\Delta = N\Delta$, in which case MAX is selected if $\overline{C}$ is true because MAX was updated last; otherwise MIN is selected. Thus, the logic equation may be implemented with a simple AND gate $G_5$ and an OR gate $G_6$, as shown. The single output applied to the multiplexer 32 from the OR gate $G_6$ will select MAX when true, and MIN when false. The multiplexer 32 which may be comprised of two sets of AND gates, one for selecting MAX and the other for selecting MIN from respective registers 20 and 18. The output of the OR gate $G_6$ enables one set directly to transmit MAX to the output buffer register 16 when true, and enables the other set via an inverter (not shown) to transmit MIN to the output buffer register 16. In that manner, peak deviation in a sampling interval is used as the criterion for the sample value to be used as best representative of the input waveform during the sampling interval.

Figure 2A:
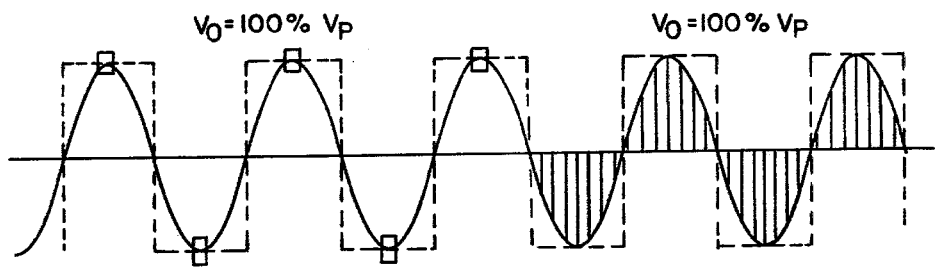
FIGS. 2a and 2b show waveforms useful in understanding the advantages of the present invention.
Figure 2B:
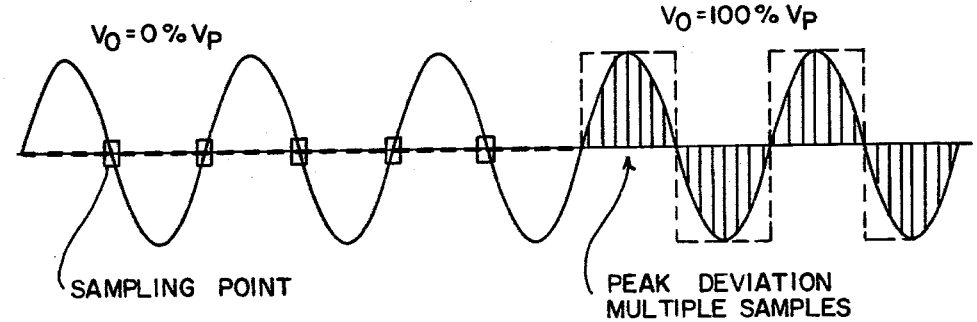

Advantages of this peak deviation sampling technique will be better appreciated from the following comparison with point sampling. The object is to encode information from an analog-to-digital converter in a format which maximizes fidelity. This is achieved by examining a number of samples per sampling interval and encoding in each sampling interval the maximum deviation from the previous sample, either positive or negative with respect to the last sample. Assuming a sinusoidal waveform and a sampling rate FS just twice the frequency $f_1$ of the waveform, with the sampling points at the center of each half cycle as shown in FIG. 2a. The result is peak sampling and results in 100% modulation, as shown by a dotted square waveform over the first few cycles. The result would be the same for the peak deviation sampling technique of the present invention as shown over the last two cycles of FIG. 2a using a sampling rate of N2 f, where N is a whole integer, such as 10. But the same result is achieved only because the sampling point at the rate FS has been selected at the peak of the sinusoidal waveform. FIG. 2b shows the result of sampling and encoding a signal phase shifted 90° at the rate FS. Under those conditions, the point sampling modulation goes to 0%, as shown in the first few cycles of FIG. 2b, but the peak deviation sampling modulation remains 100%, as shown in the last two cycles of FIG. 2b. This is because a sample is still being taken for selection at the peak. It is thus demonstrated that point sampling is very phase sensitive, while peak deviation sampling minimizes phase effects on the output represented by the dotted line waveforms.

Figure 3:
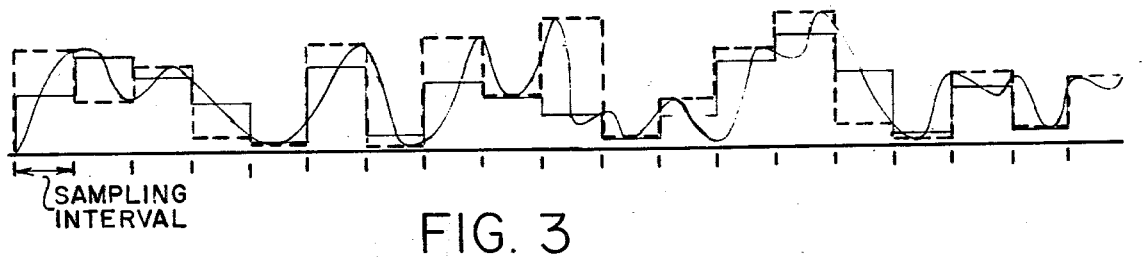
FIG. 3 shows a typical video waveform input and waveforms resulting from modulation with encoded peak deviation sampling and encoded point sampling data for comparison.

To compare point sampling with peak deviation sampling, reference will now be made to FIG. 3 which shows in a solid line waveform a typical video signal. This is an arbitrary waveform having components at or above the Nyquist limit as well as lower frequencies. If it is encoded using point sampling, the solid line step waveform is the result of modulation with the point samples, assuming the sampling point is selected at the center of each sampling interval. If a number of samples are examined (such as ten) during each sampling interval, and the peak deviation technique is employed to select the sample to be used for modulation over the entire sampling interval, the result is as shown in the dotted line waveform. The actual performance of this peak deviation sampling technique can be seen to yield higher modulation that is more representative of the input, thus maximizing the fidelity of the encoded data from the analog-to-digital converter. The encoded sample output from the buffer register 16 may be displayed directly on a cathode ray tube, or stored in a digital memory for scan conversion before display.

Operation of the system shown in FIG. 1 will now be summarized with reference to the following chart

| INPUT | 0 | 0 | 1 | 7 | 13 | 6 | 4 | 9 | 12 | 2 | 0 | 3 | 4 |
|-------|---|---|---|---|----|---|---|---|----|----|----|----|----|
| NEW   | 0 | 0 | 0 | 1 | 7  | 13| 6 | 4 | 9  | 12 | 2  | 0  | 3  |
| MAX   | 0 | 0 | 0 | 0 | 1  | 7 | 13| 6 | 6  | 9  | 12 | 12 | 0  |
| MIN   | 0 | 0 | 0 |   |    | → | 0 | 6 | 4  | 4  | 4  | 2  | 0  |
| LAST  | 0 | 0 | 0 |   |    | → | 0 | 13|    |    | →  | 13 | 2  |
| $P\Delta$ | 0 | 0 | 0 | 0 | 1 | 7 | 13| — | —  | —  | —  | —  |    |
| $N\Delta$ | 0 | 0 | 0 |   |   | → | 0 | 7 | 9  | 9  | 9  | 11 | 2  |

A video signal is sampled through two sampling intervals during which five samples per interval are taken and converted to digital form by an analog-to-digital (A/D) converter to produce the first row of digits. These samples are entered into the new data buffer register 10 at the end of each sample clock period as represented by the second row of digits. (For convenience, the video input is assumed to be zero for the video sample shown on the left.) The first sample of a sampling interval is entered into the MIN and MAX registers at the end of the first sample clock period. Thereafter, each sample latched into the register 10 is then latched into the MIN or MAX register according to whether it is less than or greater than the last sample latched in the MIN and MAX registers. At the end of the sampling interval, either the MIN or the MAX is selected as the encoded sample according to which has the greatest deviation from the last encoded sample (LAST) selected for entry into the output buffer register 16. At the end of the first sampling interval, the difference P$\Delta$ between the LAST and MAX is 13, which is greater than 0, the difference N$\Delta$. The MAX is therefore selected and entered into the register 16. Note that there are three registers in cascade, namely the new data buffer register, the MIN or MAX register, and the output buffer register. There are therefore three clock period delays in shifting a new video value to the output buffer register.

During the next sampling interval, the first new video value (6) is stored in both the MIN and MAX registers. Thereafter a new value is stored in the MAX register only if it is greater than 6, and in the MIN register only if it is less than MIN. At the end of that sampling interval a new MAX and a new MIN are available for comparison with the last sample (13) to determine which yields the greatest deviation by first comparing LAST with MIN and with MAX in adders 26 and 28 to form P$\Delta$ and N$\Delta$, and then comparing the deltas to determine which is greater. Here LAST is greater than MAX, so the P$\Delta$ is found to be less than N$\Delta$. The negative sign from the adder 28 is indicated in the chart during each clock period, and could be used to conclude without comparing the deltas, that the content of the MIN register should be selected. The MIN is always less than the LAST during this second sampling interval so the output N$\Delta$ of the adder is a positive number which, at the end is a result of MIN being equal to 2. Therefore MIN is selected for the next LAST.

As further examples, consider the following chart for third and fourth sampling intervals assumed to follow immediately after the two sampling intervals in the chart above.

```
INPUT  | 0  3  4  2  1 | 6 14 15 12  5 | 0  2  4
NEW    | 2  0  3  4  2  1| 6 14 15 12  5|  0  2
MAX    |12 12  0  3  4  4  4|6 14 15 15 15|  0
MIN    | 4  2  0  0  0  0  0|6  6  6  6  5|  0
LAST   →13  2          →  2  0        →  0 15
P∆     | — — —         |  1  2  2  2  6|14 15 15 15 —
N∆     | 9 11  2       |→ 2 —          | — — — — 15
```

In the third sampling interval, the new value entered as the MIN and MAX is 0, so that initially P$\Delta$ is still negative and N$\Delta$ equals 2, but by the end of the third sampling interval both P$\Delta$ and N$\Delta$ are equal to 2. In that case, as described hereinbefore, the last MIN or MAX update is selected. Here it is the MIN=0.

In the last sampling interval in the chart immediately above, the first sample of 6 is entered as the new MIN and MAX. Thereafter, the MAX is updated until 15 is reached, the maximum for the interval. The MIN value of 6 is carried until the last clock period, at which time a new MIN equal to 5 is entered into the register 18. Throughout the sampling interval, the MIN is greater than LAST so the sign out of the adder 26 is negative, as shown. At the same time MAX is greater than LAST. That is indicated by the actual differences of 6, 14, 15, 15, and 15. Consequently, the MAX of 15 is selected as the next LAST encoded sample.

This peak deviation technique for encoding sampled data is important in such applications as display systems where the video typically contains all frequencies up to Fc, the system cut-off frequency and it is desired to maintain fidelity with minimum encoded samples resulting in memory size savings. Other areas include bandwidth reduction systems and multiplexed data acquisition systems. Consequently, although a particular embodiment of the invention has been described with reference to a video input signal, it is recognized that modifications and equivalents for video and other applications may readily occur to those skilled in the art. Consequently, it is intended that the claims be interpreted to cover such modifications and equivalents.

What is claimed is:

1. A method for sampling a signal, to obtain samples that are most nearly representative of the signal amplitude during successive intervals, comprising the steps of taking a number of samples of the signal during each interval, and selecting for each interval, as representative of the entire interval, a sample from among those taken during the interval that has the maximum deviation from the sample selected from the immediately preceding sampling interval.

2. The method of claim 1 wherein the selection is carried out by storing the first sample of a sampling interval as both a maximal and a minimal sample, and thereafter comparing each subsequent sample with the stored maximal and minimal sample in search of a greater or lesser sample to store as a new maximal or minimal sample in place of the last maximal or minimal sample stored, then comparing the final maximal and minimal samples thus stored during the sampling interval with the sample selected for the immediately preceding sampling interval to determine which of the maximal and minimal samples finally stored for the interval has the greatest deviation from the sample selected for the immediately preceding sampling interval, and finally selecting for the sampling interval that maximal or minimal sample having the greatest deviation.

3. The method of claim 2 wherein each sample is in digital form, and comparison for the maximal or minimal having the greatest deviation is carried out by obtaining two arithmetic differences between the stored minimal and last sample selected as having the greatest deviation during the last sampling interval, and the stored maximal and the last sample selected as having the greatest deviation during the last sampling interval, obtaining the arithmetic difference between said two arithmetic differences as a third difference, then examining the sign of the third difference to determine whether the new sample is to be selected as a new maximal or minimal, according to which of said two differences is greater and when the two differences are equal, selecting as the new sample having the greatest deviation over the last sample selected as having the greatest deviation during the last sampling interval, the stored maximal or stored minimal, whichever was updated last with a new sample during the sampling interval just concluded.

4. Apparatus for sampling a signal a number of times during successive intervals, and selecting for each interval the sample most representative of the amplitude of the signal during the entire interval, comprising
means for timing sampling intervals,
first storage means for sorting samples of said interval to store for each interval two samples, the maximal and minimal samples of the interval, each new sample being compared with stored maximal and minimal samples to replace the stored maximal or minimal sample if the new sample is greater or lower than the last stored maximal and minimal samples,
second storage means for storing a selected sample from each sampling interval until the end of the next sampling interval, and
means responsive to said interval timing means for selecting from stored maximal and minimal samples in said first storage means a sample to be stored in said second storage means according to which has the greatest deviation from the last sample selected for storage in said second storage means at the end of the preceding interval.

5. Apparatus as defined in claim 4 wherein said first storage means is comprised of two storage registers, a maximal storage register and a minimal storage register, means for storing in both registers the first new sample of a sampling interval as both a maximal sample and a minimal sample, means for comparing each subsequent sample with the contents of both registers in search of a greater or lesser sample to store as a new maximal or minimal in said maximal or minimal register in place of the last sample stored, thereby to store in said maximal register the largest sample of the interval, and in said minimal register the smallest sample of the interval.

6. Apparatus as defined in claim 5 wherein said selecting means for selecting the maximal or minimal sample of the interval having the greatest deviation from the last sample selected as having the greatest deviation for the preceding interval is further comprised of additional means for comparing the final samples stored in said maximal and minimal registers with said last sample stored in said second storage means, and replacing the contents thereof with the contents of the maximal or minimal register in response to said additional means and said interval timing means signaling the end of an interval and the start of a new interval according to which of the maximal and minimal values provides the greatest deviation from said last sample stored in said second storage means.

7. In a sample data system, wherein an analog signal is periodically sampled and converted to digital form, apparatus for selecting at the end of each sampling interval the one of a number of sample values of the analog input signal taken during the sampling interval which has the greatest deviation from a sample value selected during the immediately preceding sampling interval, the combination comprising
a source of sample clock pulses,
a new data buffer register reponsive to said clock pulses for storing successive new sample values of said signal in digital form,
means for counting said clock pulses to produce one interval timing pulse for every predetermined number of clock pulses,
a minimal register and a maximal register,
means responsive to said interval timing pulses for storing a new sample value from said new data buffer register for the next sampling interval in both of said minimal and maximal registers,
first means responsive to each clock pulse during a sampling interval for comparing each new sample value entered into said new data buffer register with the contents of said minimal and maximal registers,
means responsive to said new sample comparing means for storing the contents of said new data buffer register in said maximal register when the new sample value is greater than the last sample value stored in said maximal register, and in said minimal register when the new sample value is less than the last sample value stored in said minimal register,
an output buffer register, second means for comparing the contents of said output buffer register with the contents of said maximal and minimal registers, and
multiplexing means responsive to said second means for comparing, for entering into said output buffer register the contents of whichever of said minimal and maximal registers has a sample value with the greatest deviation from the last sample value stored in the output buffer register, and the contents of the one of said maximal and minimal registers which was updated last when the deviations of both are equal, whereby the contents of said output buffer register is always a sample that is chosen as the best representative of the sampled signal during the last sampling interval.

* * * * *